Sept. 21, 1965 J. L. A. JOLY 3,207,839
BUSDUCT EQUIPMENT WITH POLARIZED ELEMENTS AND CONDUIT
SHELL JOINING MEANS
Filed Dec. 13, 1962 5 Sheets-Sheet 1

INVENTOR:
JEAN L. A. JOLY
BY
Robert Henderson
ATTORNEY

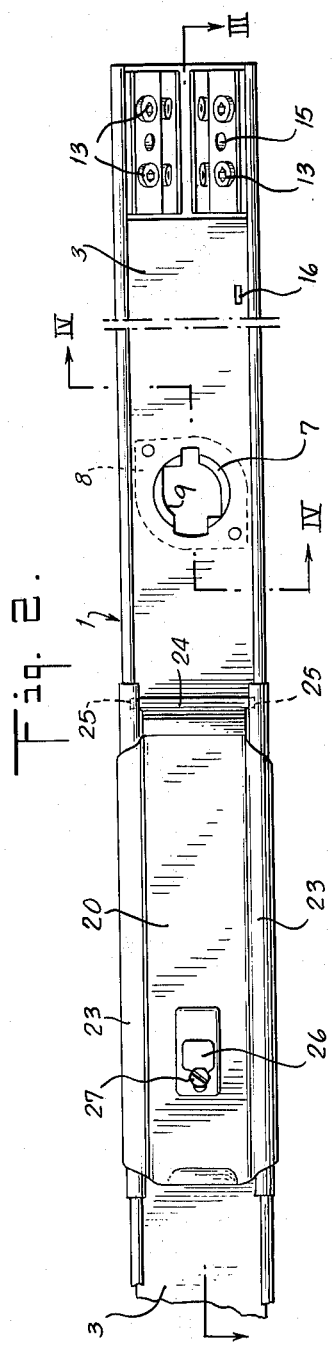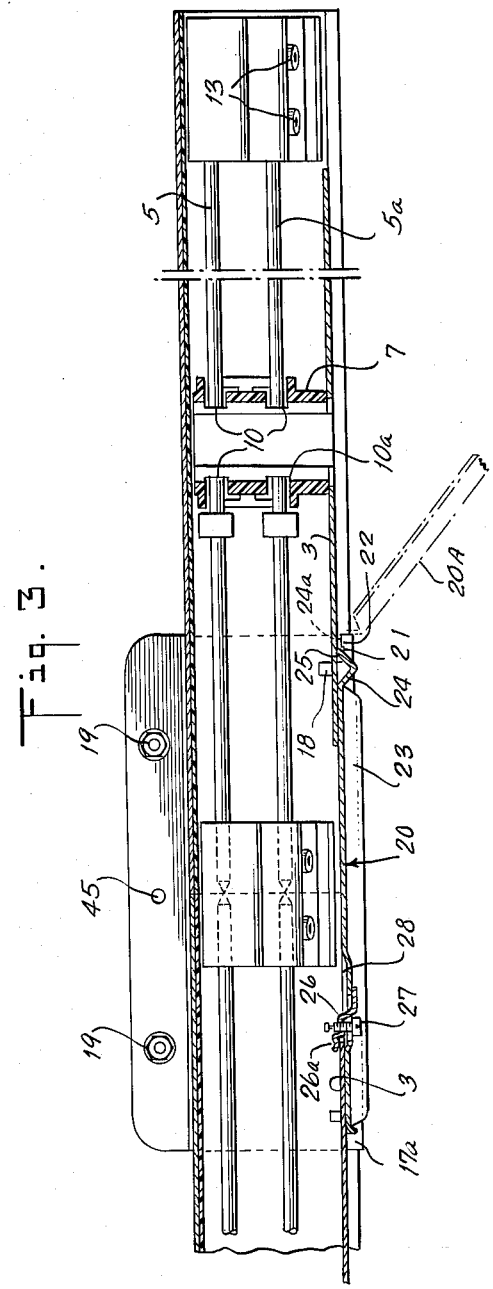

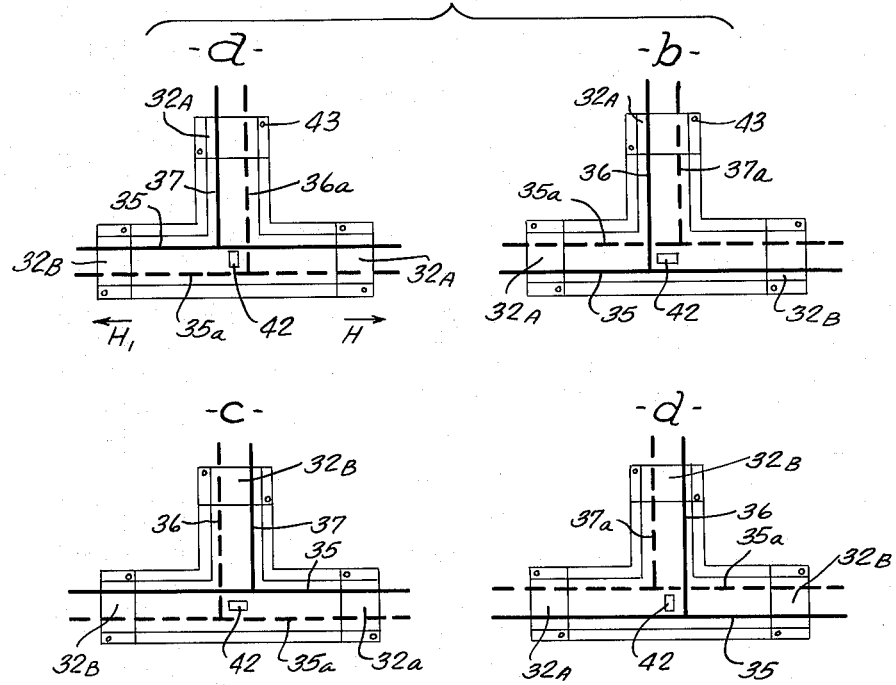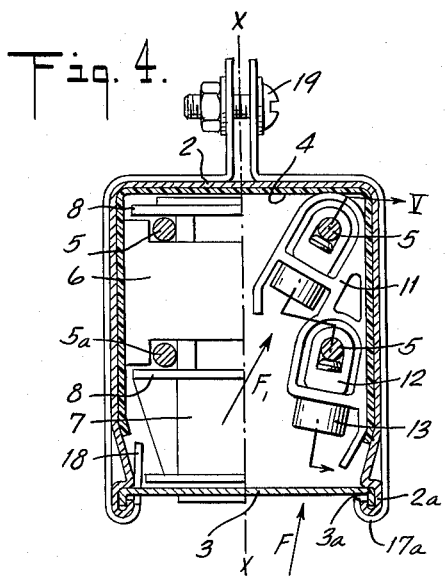

Sept. 21, 1965         J. L. A. JOLY              3,207,839
       BUSDUCT EQUIPMENT WITH POLARIZED ELEMENTS AND CONDUIT
                      SHELL JOINING MEANS
Filed Dec. 13, 1962                            5 Sheets-Sheet 4
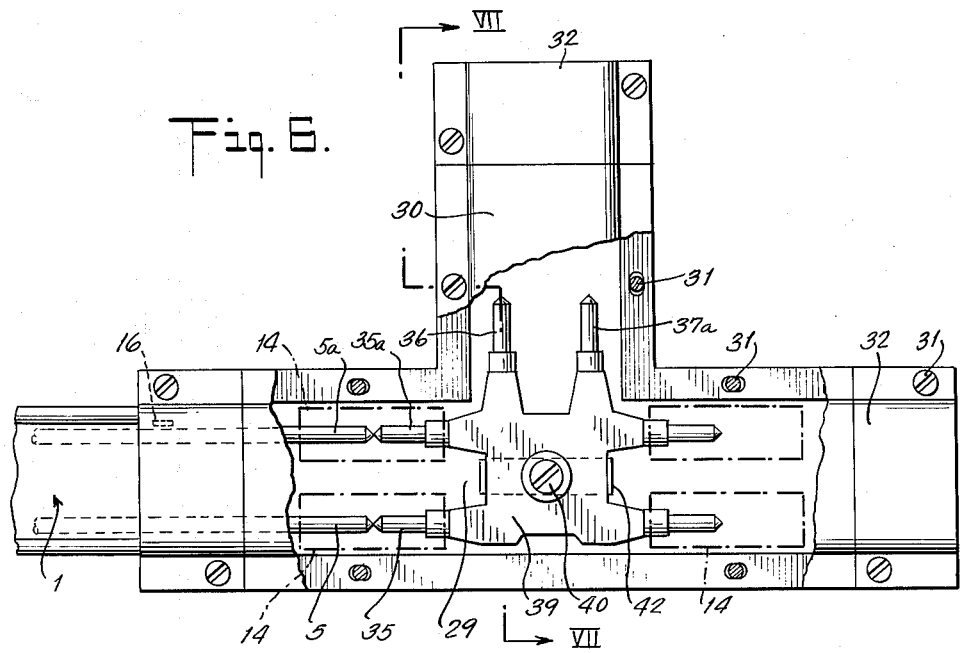
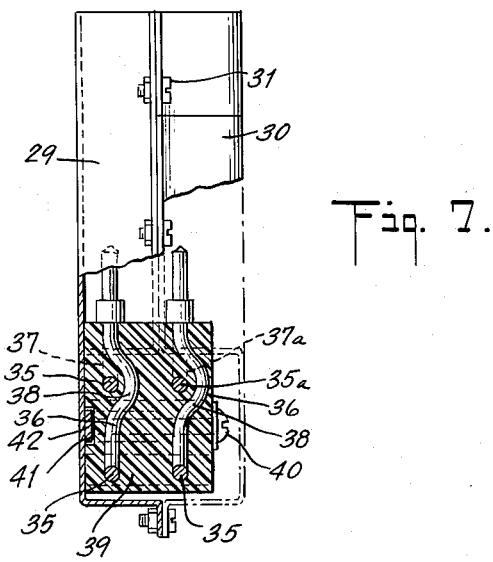
INVENTOR:
JEAN L. A. JOLY
BY
Robert Henderson
ATTORNEY Sept. 21, 1965 J. L. A. JOLY 3,207,839
BUSDUCT EQUIPMENT WITH POLARIZED ELEMENTS AND CONDUIT
SHELL JOINING MEANS
Filed Dec. 13, 1962 5 Sheets-Sheet 5
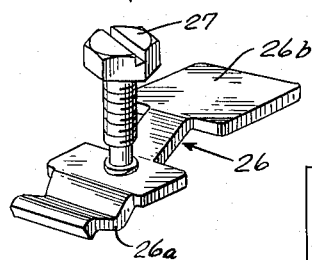
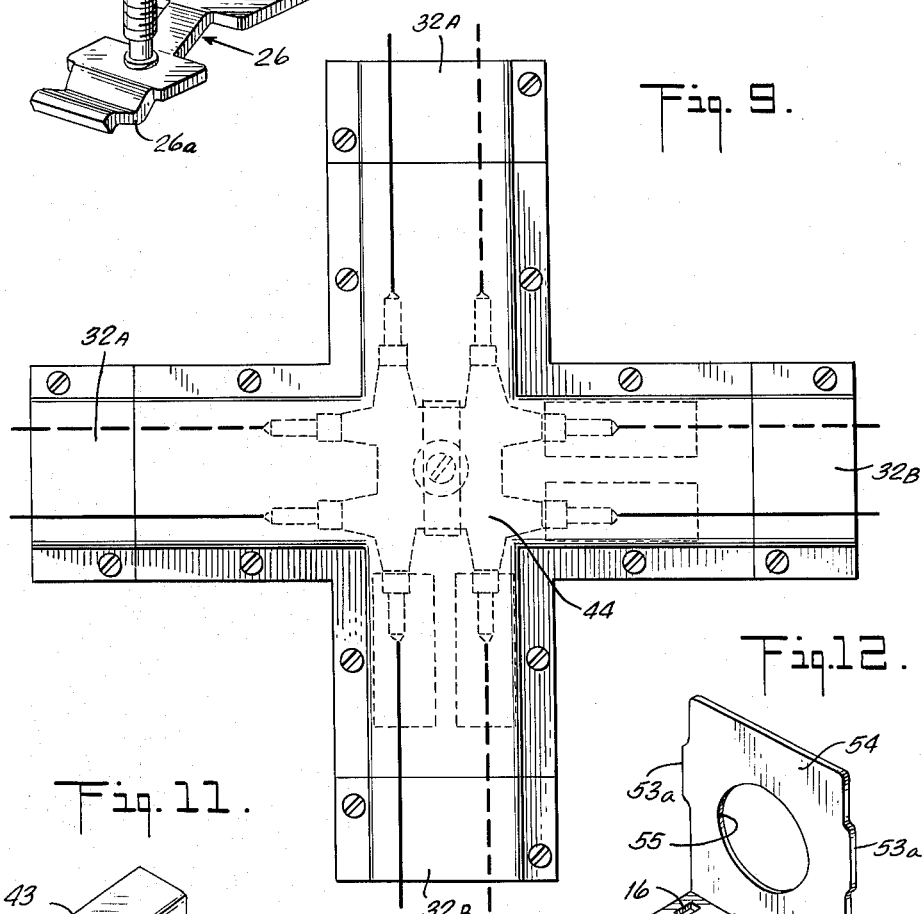
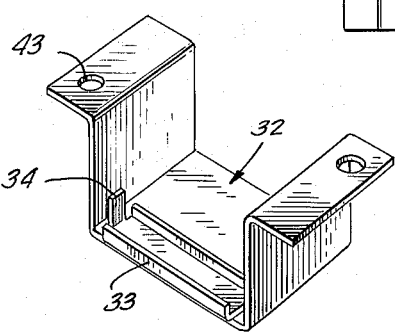
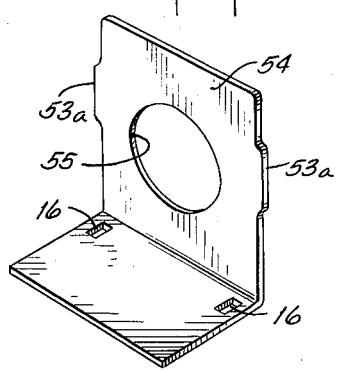
INVENTOR:
JEAN L. A. JOLY
BY
*Robert Henderson*
ATTORNEY

United States Patent Office 3,207,839
Patented Sept. 21, 1965

3,207,839
BUSDUCT EQUIPMENT WITH POLARIZED ELEMENTS AND CONDUIT SHELL JOINING MEANS
Jean L. A. Joly, Houilles, France, assignor to La Telemecanique Electrique, Nanterre, France, a company of France
Filed Dec. 13, 1962, Ser. No. 244,315
Claims priority, application France, Dec. 18, 1961, 882,291
8 Claims. (Cl. 174—72)

This invention relates to electrical supply and distribution equipment of the type including a plurality of generally straight conduit sections assembled end to end and containing a number of electric conductor bars or wires extending therethrough and electrically interconnected as between the adjacent conduit sections. Means are provided for connecting units of electrical apparatus to the continuous line thus provided at selected spaced points along its length.

It is convenient in such a system to provide each of the conduit sections as well as the conductors and conductor-supporting and -interconnecting means therein, with more or less complete structural symmetry in relation to a longitudinal midplane, generally the vertical midplane, of the conduit section. However, it will be understood that in many systems all the conductors will not be electrically equivalent with one another. Thus, in the case of a three-phase supply system including a neutral conductor, the neutral conductor differs radically in function from each of the phase conductors. The same is true in the case of the four conductors of a two-phase system, and also in the case of a D.-C. system which may include a plurality of conductors at different potentials and a balancing conductor. It will thus be appreciated that while the resulting line system may be and preferably is symmetrical structurally, it will frequently be dissymmetrical functionally.

It is important in such cases that measures be taken positively to prevent the possibility of erroneously connecting a unit of apparatus with such a line since poor operation and serious short-circuiting hazards may result. Various measures have been proposed for this purpose but none of them has been found entirely satisfactory in practice. Thus, it has been suggested to provide the plugging apertures with which a removable connector is to be inserted, in such a manner that the connector can only be engaged in a prescribed manner with the respective rigid conductors in the conduit, for example by making it necessary to rotate the connector in a prescribed direction after insertion into the aperture, suitable one-way locking means being provided in the channel aperture to prevent reverse rotation. Such an arrangement however has a serious defect in that it makes it necessary to assign its specific function to each of the conductors in a conduit section, as by distinguishing the neutral from each of the phase conductors for example, even before the conduit sections have been assembled, although all the conductors are alike and similarly disposed; this necessity seriously complicates assembly operations.

Another known method of approaching the problem, as disclosed e.g. in U.S. Patent 2,968,782, has involved the use of conduit sections of dissymetrical shape associated with conductors having dissymmetrical branches so that they can only be bridged across the conduit sections in one, prescribed, direction.

However, in the case of structurally symmetrical conduit sections of the kind mentioned above, both opposite ends are similar so that they can be connected up indiscriminately in either sense with conduit sections that are already in position, and this possibility will not be prevented by the provision of identifying markings or the like provided externally of the conduit sections. This, as earlier noted, may result in serious malfunction since if a conduit section has been mounted in inverted position, i. e. with its ends reversed, a phase current may flow through the neutral conductor, or vice versa.

It is an object of this invention to provide electric supply equipment of the general type specified above, wherein each conduit section can only be coupled to the adjacent ones in one manner thereby to assure the correct state of continuity as between the respective conductors throughout the supply circuit, while positively and reliably preventing erroneous connection between the conduit sections. Another object is to provide electric supply equipment of the channelled conductor type in which all the conduit sections are substantially symmetrical structurally to opposite sides from a longitudinal midplane, and yet no conduit section can be mounted in inverted position. A further object is to provide in connection with such electrical supply equipment, branched conduit sections, of T and/or cruciform configuration, for the connection of branch lines to a main line of the system, which will possess corresponding features of irreversibility so as to prevent erroneous connection between conductors of the main line and the branch line. Further objects of the invention will appear as the disclosure proceeds, with reference to a specific embodiment selected by way of illustration but not of limitation and illustrated in the accompanying drawings, wherein:

FIG. 2 is a bottom plan view of part of a straight conduit section;

FIG. 3 is a section on line III—III of FIG. 2;

FIG. 4 is a section on line IV—IV of FIG. 2;

FIG. 5 is a section on line V—V of FIG. 4;

FIG. 6 is a plan view of a T-shaped coupler conduit section, of a type similar to that shown in FIG. 1;

FIG. 7 is a section on line VII—VII of FIG. 6;

FIGS. 8a, 8b, 8c and 8d are schematic views depicting four possible patterns in which the T coupler of the preceding figures may be provided depending on requirements, specifically on the "handedness" of the circuit;

FIG. 9 is a plan view of a cruciform coupler conduit section;

FIGS. 10, 11 and 12 are perspective views of accessory components used according to the invention, and specifically, an attachment lug for a cover plate, a strap member for use in connection with a T or a cruciform coupler conduit section, and an apertured end cover plate, respectively.

Figure 1:
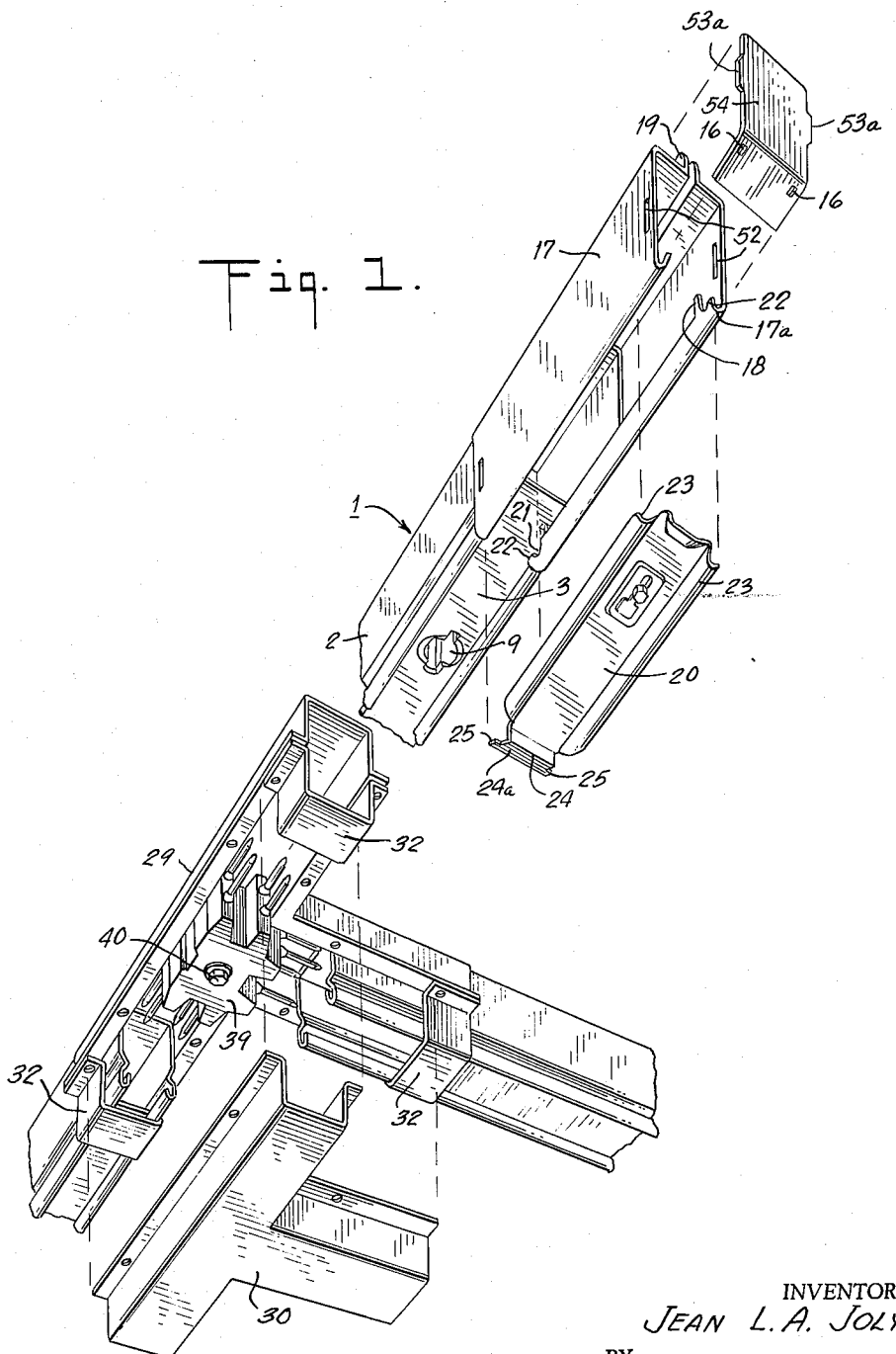
FIG. 1 is a perspective view, as seen from below and partly exploded, of part of supply equipment according to the invention including a main line and a secondary line branching off therefrom by way of a T connector.

The invention is illustrated as applied to electric power supply equipment of a type described in copending patent application No. 175,912, now Patent #3,154,646, filed February 27, 1962, including as shown in the drawings a plurality of rectilinear conduit sections or elements 1 each comprising a channel member 2 formed from suitable metal strip (see especially FIG. 4) having its side edges bent inwards as at 2a and crimped around the outturned edges 3a of a flat strip 3 extending across and sealing the open side of the channel. The resulting closed conduit element is lined internally with a layer of insulation 4 and contains within it the electric supply conductors 5, which in the illustrated example are four in number and are symmetrically disposed to opposite sides of a longitudinal midplane X—X. The conductors are in the form of bars or rigid wire of any desired cross section, herein shown as circular.

The conductors are supported within the tubular conduit section by means of supporting assemblies spaced along the length of the element and each consisting of a pair of cooperating bearing members 6 of insulating material and a pivoted barrel member 7. The barrel members are formed with flanges 8 which serve to seal the slots receiving the conductors in the bearing members, and said flanges are so shaped (see especially FIG. 2) that they will only permit the barrel to be rotated in one direction and by not more than one quarter of a revolution. When the barrel is thus rotated one quarter turn, a connector, not shown, of dissymmetrical cross sectional shape engaged in the opening 9 of the barrel is enabled to make connection with the conductors 5. For this purpose, resilient contact elements of said connector are adapted, on insertion of the connector, to fit into the openings 10 of the barrel 7, so that when the barrel is rotated as described above such openings are made to register with the conductors 5 and the contact elements of the connector electrically engage the conductors.

It is herein assumed that one of the four conductors 5 of the set, specifically conductor 5a, is a neutral while the other three are phase conductors of a three-phase distribution system. It is accordingly important, since the connector contact element engaged in the opening 10a (FIG. 3), at all time contacts the conductor 5a to ensure that said conductor 5a can only be connected in series with other neutral conductors 5a but not with any one of the phase conductors 5. It is noted that all the conductors of both types 5 and 5a contained in any one of the rectilinear conduit elements are exactly the same length as the conduit elements, and that the interconnections between the conduit elements, as well as the interconnections between the conductors contained therein, are made end-to-end. For the purpose of effecting said interconnections, the flat strip 3 of each of the conduit elements is made somewhat shorter than the channel strip 2 thereof, so as to leave open sections at each end of the conduit element 1 through which the conductors of adjacent conduit elements can be reached in order to interconnect them by way of a pair of double coupling members 11.

Each dual coupling member 11 (see especially FIGS. 2, 4 and 5) comprises a pair of metallic sleeves 12 each provided with two axially spaced set screws 13, said sleeves being imbedded in a supporting mass of plastic material 14 conforming in outer contour to that of the conduit element 1. Each sleeve is further formed with a central transverse hole 15 whereby each coupling member can be slid along the conductors 5 so as to bring the member in accurately bridging relationship across the end-to-end junction of a corresponding pair of said conductors. The plastic support 14 is so shaped, as best seen in FIG. 4, that the heads of the set screws 13 will be readily accessible to a suitable driver tool in the direction indicated by arrows F and $F_1$. For this purpose the set screws 13 are arranged so as to fan out in each coupling member in a plane normal to the longitudinal direction of the coupling member.

The means for interconnecting the conduit elements will now be described. Each flat strip 3 is formed near each end of it and on the same side of it as that where the neutral conductor 5a is located, with a rectangular opening 16 which thus serves to identify the side of the conduit along which the conductor 5a extends. The outer side faces of the strip 2 are engageable by a pair of shell members 17 (see FIG. 1) having inturned side flanges 17a adapted to overlie and surround the flanges 2a and 3a of the strips 2 and 3. Of the two shells 17, one is formed, near one end of its inturned flange 17a, with a projecting lug 18 engageable into the complementary rectangular opening 16 formed in the strip 3, thereby preventing the shell thus formed from being mounted on the wrong side of the conduit element 1.

It will therefore be seen that even though both ends of a conduit element 1 appear alike, it is necessary when juxtaposing a pair of such conduit elements end-to-end that the openings 16 formed in the strips 3 of both said elements shall be positioned on the same side, otherwise said elements cannot be coupled by means of the coupling shell members 17, and this ensures that all the neutral conductors 5a are properly interconnected continuously through the series of conduit elements. To complete the assembly screws such as 19 (see FIGS. 3 and 4) engaging registering holes formed in adjacent upstanding flanges at the tops of the shell members 17 are tightened, thereby clasping the coupling shells around the elements 1.

It will be noted that after such interconnection of the conduit elements 1 has been completed, the strips 3 of adjacent conduit elements are still separated by the gap due to the foreshortened length of said strips 3 relative to the channel strips 2, such gap as previously mentioned being provided to permit actuation of the dual coupling members 11. Cover plates 20 provide bridging portions for sealing these gaps, while permitting the properly clamped condition of said coupling members to be tested at any subsequent time by removal of said cover plates. The afore-mentioned gaps correspond in length substantially to twice the length of a coupling member.

Each of the coupling shells 17 is formed with rounded notches 21 near the ends of its inturned flanges 17a. Moreover, that one of said shells provided with the lugs such as 18, has the portion of its flange 17a extending between notch 21 and the end of the shell, somewhat shorter in length than the main part of said flange, as shown at 22, so that after assembly there remains a short straight slot between the flange edge 22 and the adjacent strip 3, as may be seen in FIG. 3.

The cover plates 20 are metal strips formed with curved flanges 23 along their longitudinal sides adapted to overlie the flanges 17a. Further at one end the cover plate 20 has a flanged projecting part 24 forming substantially a right angle as shown clearly in FIG. 1. The flat outer portion of this flanged part 24 is seen to be cut out at both sides so as to provide a pair of flat side lugs 25. When the cover plate 20 is placed in the open, angled position shown at 20A in FIG. 3, with the outer face 24a of its flanged part in engagement with the strip 3 of a conduit element, one of the lugs 25 may be directly inserted into a notch 21 of the related coupling shell 17 which is not provided with the lugs 18, and the cover plate 20 can then be pivoted around the lug 25 thus inserted until the opposite side lug 25 is in turn inserted into the related notch 21 of the other coupling shell, through the afore-mentioned slot defined between the strip 3 and the short edge section 22 of flange 17a. The cover plate is then rotated to its closure position, whereupon the pivot lugs 25 are inserted in an angled position into the notches 21 (see FIG. 3) and the cover plate is thus locked to the coupling shells 17.

At the end remote from that comprising the pivot lugs 25, the cover plate 20 is locked to the adjacent edge of strip 3 by means of a lug 26 provided with a set screw 27, which lug is engageable into a longitudinally elongated slot 28 formed in cover plate 20. With the end 26a of lug 26 slid into engagement with the adjacent end of strip 3, the screw 27 may be tightened whereby the opposite end 26a of the lug 26 provides a fulcrum for the lug, which acts as a lever clamping the edges of the cover plate into tight engagement with the assembled coupling shells 17 while at the same time said cover plate is locked to the assembled conduit elements 1 and seals the gap between them.

In installating an electric distribution or supply system it is frequently necessary to provide secondary lines branching off from either side, or from both sides simultaneously, of a main line provided by a series of interconnected conduit elements of the kind just described. For use in such situations the invention provides T-shaped and cross-shaped coupling members respectively, now to be described.

A T-coupling member as shown in FIGS. 1, 6 and 7 comprises a pair of channel elements 29 and 30 having cooperating flanged side edges assembled together with screws 31. The channel element 30 which is to be positioned adjacent the strips 3 of the straight conduit element from which the coupling member under consideration is to project, i.e, that element 30 which is to provide the bottom of the T-connection, has shorter sides than the sides of the upper channel element 29, with the remaining length being filled by straps 32. Each such strap is provided at its inner face, as seen in FIG. 11, with a spacer insert 33 adapted to project into the recess defined by the flanges 2a and 3a of the conduit element along a face of said element; the insert 33 is provided at one side with a lug 34 projectable into the rectangular opening 16 of an element 1 connected with one branch of the T, which lug 34 corresponds in function to the aforementioned lugs 18 of the coupling shells 17. When the conduit element is in assembled condition (also see FIG. 1), its extremity is partially covered by the upper channel element 29 of the T coupling, and the conductors 5 and 5a contained in it assume positions in end-to-end abutting relation with the conductors 35 and 35a contained within the T coupler, thereby providing the requisite continuity throughout the main electric supply line in which the T connection is to be inserted.

Brazed to the three conductors 35 and neutral conductor 35a in the T coupler are pairs of branch conductors 36 and 37. The conductors 36 extend from conductors 35 (or 35a) which are farthest removed from the vertical leg of the T, and are bent as at 38 so as to clear the other conductors 35. The conductor 37 on the other hand extends from the conductors 35 (or 35a) which are closest to the vertical leg of the T.

The group of four conductor members 35, 36 and 37 each of which is generally of T shape, is imbedded in a block of insulating plastic 39 which should be selected capable of withstanding the elevated temperatures to which the conductors may be brought in service. The block 39 is secured in the bottom of the channel element 29 with a screw 40.

A T connection may have to extend left or right from a main line depending on circumstances. Furthermore, considering the main line itself, the particular conductor 35a, such as the neutral, may be located to left or right of the line, whereas the corresponding, say neutral, conductor in the branch line may in turn have to be located to left or right of such branch line, all depending on the particular requirements of the installation. In order to cater for such varying demands, there are made available according to the invention four different types of T couplings as schematically illustrated in FIGS. 8a, b, c and d. The couplings comprise two different types for each of the basic components constituted by the blocks 39 and straps 32, and four different types of channels 29, these latter differing from one another only in the positions of the holes formed therein.

Thus the T coupling shown in FIG. 8a can be used either in case of a main line directed as indicated by arrow H with a secondry line branching off from its left, or in the case of a main line in direction $H_1$ with a secondary branching off to its right. However, in the direction indicated at H the particular conductor 35a extends along the right side while in the direction $H_1$ such conductor extends along the left side of the main line.

Similar relative arrangements of the main line conductors are present in the case of the T coupler shown in FIG. 8c. However in the branch line, whereas with such branch line extending to the left (arrow H) the particular conductor 36a connected to the particular main conductor 35a extends along the right in the case of FIG. 8a, it extends along the left in the case of FIG. 8c.

It will be readily understood that the T couplers shown in FIGS. 8b and 8d respectively correspond to the cases where conductor 35a extends along the left in the direction of arrow H, and extends along the right in the direction of arrow $H_1$.

Since the four T couplers are shown similarly disposed in all four diagrams of FIGURE 8, it will be easily seen as regards the branch lines, that in FIG. 8a and FIG. 8d, the left hand conductors in the vertical leg connect with the conductors 35 lying closer to said leg while the right hand conductors connect with the conductors 35 lying farther away therefrom. In other words, it will be seen that the block 39 of T conductors is the same in both cases shown in FIGS. 8a and 8d. Similarly it may be seen that the block of T conductors is the same in FIGS. 8b and 8c.

The two different kinds of blocks thus provided are identified by the provision of an elongated recess 41 (see FIG. 7) which is directed parallel to the branch line in the case of FIGS. 8a and 8d, and parallel to the main line in the case of FIGS. 8b and 8c. Cooperating with this recess is an elongated projection 42 (FIG. 8) soldered to the base of each channel 29 and thereby preventing the wrong block from being mounted in position. The lugs 42 are formed with threaded holes (see FIGS. 6) for receiving the screws 40.

It will be understood from what has gone before that the straps 32 assembled over the ends of each shell element 29 should have a lug 34 positioned on the side of the conductors shown in dash lines in FIGS. 8a through 8d, and towards that transverse edge thereof which corresponds to the end of each branch. Thus, two kinds of strap members are required, since the lug 34 can only assume one of two positions. In each type of strap 32 one of the attachment holes 43 of the strap is positioned near the lug 34 (as will be clear from FIG. 11), so that the side on which said lug is located can be easily identified as the side at which the attaching screw of the strap is closer to a branch of the T coupling. In this way the particular side, left or right, along which the particular conductor 5a extends, can readily be identified at the branching-off point.

Designating 32A and 32B the two different types of straps just described in order to distinguish each from the other, it will be seen that in the T-couplers shown in FIGS. 8a and 8b the vertical legs both comprise 32A type straps, while in FIGS. 8c and 8d the vertical legs comprise 32B type straps, whereas moreover the conductor blocks 39 differ in any pair of the T couplers.

A cruciform coupler member will now be described as used according to the invention for connecting to a main line two opposite secondary lines branching off in opposite directions. As shown in FIG. 9, a cruciform coupler comprises a pair of cruciform channel elements, with the lower element 44 having somewhat shorter branches than the upper element, and having the end portions of its branches completed by the provision of strap members 32 of the kind described above, two adjacent ones of which are of the 32A type and the other two of the 32B type. It will be easily seen that a single type of cruciform coupler will be sufficient to cater for all possibilities. This is because either one of the two mutually normal arms of the cross can be interposed in the main line, so that a branch line can be made to start off with a 32A type strap or a 32B type strap as required, and in either case it is possible to provide a 32A type strap on the right and a 32B strap on the left or vice versa.

In mounting either a T coupler or a cruciform coupler, the conduit elements are first assembled by means of the straps 32 cooperating with the upper channel element of the coupler, the conductor coupling means are positioned and clamped as described in connection with the assembling of the straight conduit elements, and the gap which served to enable this operation is finally sealed by means of the channel 30 of the T coupler or the channel 44 of the cruciform coupler as the case may be.

The tubular conduits may be mounted in any of various ways on supporting structure such as at the top of a room.

Thus, the channel elements 17 of the straight conduit elements are formed with a hole 45 (FIG. 3) midway along the length of the element, for direct attachment of the conduit element to vertical supporting brackets or to spaced points along the vertical web of a T-girder of a steel framework for example.

Further each of the shell members 17 is formed with rectangular slots 52 (FIG. 1) in its side wall near each end of it. At each end of a supply line there is provided a pair of coupling shell members 17 in opposed relation, and an L bent end cover plate 54 is adapted to be positioned over the open ends of said members, with side lugs 53a of the end cover plate being insertable into the slots 52 of the shell members. The cover plates 54 are further provided with apertures 16 at both sides of the bottom flange of the plate for insertion thereinto of the lug 18 present in one of the shell members as earlier described. The end cover plates 54 may be solid, as shown in FIG. 1, for use at the terminal end of the supply line, while at the initial end of a line a perforate cover plate may be used as shown in FIG. 12, having a circular hole 55 lined with insulation for the insertion of a conductor cable to be connected with the internal conductors of the line by means of coupling members as earlier described.

It will be understood that many departures may be made from the details of the embodiment illustrated and described without departing from the scope of the invention. In particular, the basic conduit elements to which the invention is shown as applied may assume a variety of forms other than that shown by way of example.

What I claim is:

1. Electrical supply and distribution equipment comprising a plurality of straight conduit sections, having a cross-section symmetric with respect to a longitudinal midplane and an aperture adjacent each end of each of said sections, in the wall of each section, both of said apertures being located to one and the same side of said midplane; a plurality of longitudinal conductors similarly arranged symmetrically in each section with respect to said midplane, said conductors having lengths coextensive with the lengths of the corresponding section; insulating supporting means in each section for supporting said conductors; conductive conductor-coupling means electrically interconnecting corresponding conductors in consecutive sections; and conduit-coupling means, for interconnecting consecutive conduit sections, comprising two shell members at least partly surrounding the adjacent ends of said consecutive sections and at least partly enclosing said conductor-coupling means, one of which shell members has two lugs in engagement separately with said apertures adjacent to adjacent ends of said consecutive sections, and means for tightening said shell members around both said consecutive sections.

2. Equipment according to claim 1, wherein each of said conduit sections has a wall perpendicular to said midplane and shorter than the remainder of said section at both ends thereof, and further comprising, associated with said conduit-coupling means, a cover member extending between opposed edges of said walls of two consecutive sections; said conductor-coupling means being disposed at adjoining ends of said sections, and the area between said opposed edges providing an opening affording access to said conductor-coupling means.

3. Electrical supply and distribution equipment comprising a plurality of similar channel members having a longitudinal midplane; the same number of flat walls, each inwardly bridging the flanges of one of said channel members perpendicularly to said midplane, each of said walls being similarly foreshortened with respect to each end of its related channel member and provided with an aperture adjacent each end thereof, both of said apertures being similar and similarly located with respect to the said latter ends and to one side of said midplane; a plurality of longitudinal conductors symmetrically arranged in each conduit section constituted by one channel member and the corresponding flat wall, said conductors being symmetrically arranged with respect to said midplane and having lengths coextensive with the lengths of the channel members; insulating supporting means in each section for supporting said conductors; conductive conductor-coupling means for electrically interconnecting corresponding conductors in consecutive sections; and conduit-coupling means between two consecutive conduit sections comprising at least two shell portions at least partly surrounding the adjacent ends of said consecutive sections and at least partly enclosing said conductor-coupling means, one of which shell portions has a lug, toward each end thereof, each engaging in a said aperture in the flat walls in consecutive conduit sections, a bridging portion between oppositely facing flat-wall ends and means for securing said shell portions and bridging portion around said consecutive sections.

4. Electrical supply and distribution equipment comprising a plurality of similar flanged channel members having a longitudinal midplane; the same number of flat strips having evenly spaced openings adapted for connector engagement, each of said strips inwardly bridging the edges of one channel member perpendicularly to said midplane, said strips being similarly foreshortened with respect to each end of said channel members and provided with an aperture adjacent each end thereof, both apertures being similar and similarly located with respect to the said latter ends and to one side of said midplane; a plurality of longitudinal conductors symmetrically arranged in each conduit section constituted by one channel member and the corresponding strip, said conductors being symmetrically arranged with respect to said midplane and co-extensive in length with said channel members; insulating supporting means in each section for supporting said conductors; conductive conductor-coupling means electrically interconnecting corresponding conductors in consecutive sections; and conduit-coupling means connecting, end-to-end, two consecutive conduit sections, said conduit-coupling means comprising a pair of opposite shell members engageable about the opposite, outer side surfaces of a pair of adjacent channel members to bridge the joint between them in symmetrical relation with respect to said midplane, said shell members having inturned flanges adapted for cooperation with the edges of said channel members and the said flange of one shell member having at least two lugs for cooperation with said apertures adjacent the strip ends which face each other in the end-to-end relationship of the channel members; means associated with said shell members, opposite to said shell flanges for clamping said shell members about said channel members; and means for bridging a gap between said strip end edges and between said inturned flanges.

5. Electrical supply and distribution equipment comprising a plurality of similar flanged channel members having a longitudinal midplane; the same number of flat strips having evenly spaced openings adapted for connector engagement, each of said strips inwardly bridging the edges of one channel member perpendicularly to said midplane, said strip being similarly foreshortened with respect to each end of said channel members and provided with an aperture adjacent each end thereof, both apertures being similar and similarly located with respect to the said latter ends and to one side of said midplane; a plurality of longitudinal conductors symmetrically arranged in each conduit section constituted by one channel member and the corresponding strip, said conductors being symmetrically arranged with respect to said midplane; insulating supporting means in each section for supporting said conductors; and branched coupling means for connecting straight sections comprising a first channel-sectioned shell member including a first leg and at least one second leg branching off therefrom; further shell members cooperating with the terminal portion of each said leg for surrounding the terminal portion of one of said conduit sections, each said further shell member being provided with a lug cooperating with the aperture of the strip end of said terminal portion of the conduit; means for clamping said shell members around said conduit; a block of insulating material externally conformed to correspond with the internal contour of said branched channel-sectioned shell member; branched conductors embedded in said block and corresponding in number and position to the conductors in said conduit sections for electrical connection therewith; means for connecting end-to-end respectively both said kinds of conductors; and means for covering said first channel-sectioned branched shell member between said further shell members.

6. Equipment according to claim 4, wherein said bridging means comprise a cover plate; said cover plate having a pair of laterally projecting pivot lugs at one of its ends for pivotal engagement with slots defined by said inturned flanges of said coupling shell members, and means locking the opposite end of the plate in engagement with an end portion of said flat strip of an adjacent conduit section.

7. Equipment according to claim 5, including interengageable means in the first shell member and on the block of insulating material positioned therein respectively, for interengagement only when said block is in a prescribed relative position with respect to said conduit member.

8. Equipment according to claim 5, including first interengageable means in the first shell member and on the block of insulating material positioned therein respectively and further interengageable means between said first shell members and each said further shell member in interrelationship with said first interengageable means for preventing said block and further shell members from being mounted otherwise than in a prescribed interrelated position.

References Cited by the Examiner

UNITED STATES PATENTS

| | | | |
|---|---|---|---|
| 1,590,569 | 6/26 | Fisk | 339—21 |
| 2,585,770 | 2/52 | Hammerly | 339—22 |
| 2,626,301 | 1/53 | Hammerly | 174—99 |
| 2,659,874 | 11/53 | Veitch | 339—22 |
| 2,903,503 | 9/59 | Carlson et al. | 174—99 |

FOREIGN PATENTS

| | | |
|---|---|---|
| 995,116 | 8/51 | France. |
| 1,243,952 | 9/60 | France. |

JOHN F. BURNS, *Primary Examiner.*

JOHN P. WILDMAN, E. JAMES SAX, DARRELL L. CLAY, *Examiners.*